United States Patent [19]

Gee et al.

[11] Patent Number: 5,014,550

[45] Date of Patent: May 14, 1991

[54] METHOD OF PROCESSING MASS AIR SENSOR SIGNALS

[75] Inventors: Gregory P. Gee, Drayton Plains, Mich.; Edward J. Martin, Luxembourg-Belair, Luxembourg; David P. Prawdzik, Holly, Mich.

[73] Assignee: General Motors Corporation, Detroit, Mich.

[21] Appl. No.: 518,594

[22] Filed: May 3, 1990

[51] Int. Cl.$^5$ ............................................. G01M 15/00
[52] U.S. Cl. .................................. 73/118.2; 73/204.18
[58] Field of Search .............. 73/118.2, 204.11, 204.18

[56] References Cited

U.S. PATENT DOCUMENTS 4,850,218  7/1989  Tutumi ............................... 73/118.2

Primary Examiner—Jerry W. Myracle
Attorney, Agent, or Firm—Tim G. Jaeger

[57] ABSTRACT

A mass air flow meter has a time lag which varies according to the air flow rate. A digital filtering method enhances the raw meter output signal by calculating a correction term based on varying time constants which are dependent on the instantaneous raw signal. The correction term is added to the raw signal. Alternatively first and second order time constants are used to calculate first and second order correction terms.

6 Claims, 1 Drawing Sheet

METHOD OF PROCESSING MASS AIR SENSOR SIGNALS

FIELD OF THE INVENTION

This invention relates to a method of processing signals from a mass air sensor and particularly to a digital method of enhancing the signals.

BACKGROUND OF THE INVENTION

To allow accurate calculation of fuel injection amounts in an internal combustion engine it is necessary to first accurately determine the mass air flow rate. When the air rate is known, the fuel amount is calculated according to a desired air/fuel ratio. To allow rapid response of fuel control to air flow transients, the mass air flow must be determined with minimum delay.

Commonly, hot element anemometers are used as air flow meters. In many cases, these meters have a slow response time and thus do not rapidly track air flow transients. Moreover, a characteristic of such thermal devices is that the response time varies with the air flow rate, higher air flow rates yielding faster response times. Thus the amount of delay or error in the meter output depends on the air flow rate.

SUMMARY OF THE INVENTION

It is therefore an object of the invention to provide a method of augmenting the signal from a mass air flow meter to increase its effective response time. In particular it is an object to provide a method of digitally calculating a value closely simulating the actual air flow rate from the output signal of a thermal mass air flow meter.

The invention is carried out by digitally filtering the output signal of an air meter using a varying time constant to determine a differential filter term.

Further the invention is carried out by the method of processing the signal from a mass air flow sensor comprising: establishing filter time constants as a function of the signal, periodically sampling the signal and using each sampled value as an input, determining the time constant for each input, and calculating an output for each input as a function of the input values and the time constant for each input, whereby the outputs more nearly represent the actual mass air flow rate than does the signal.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
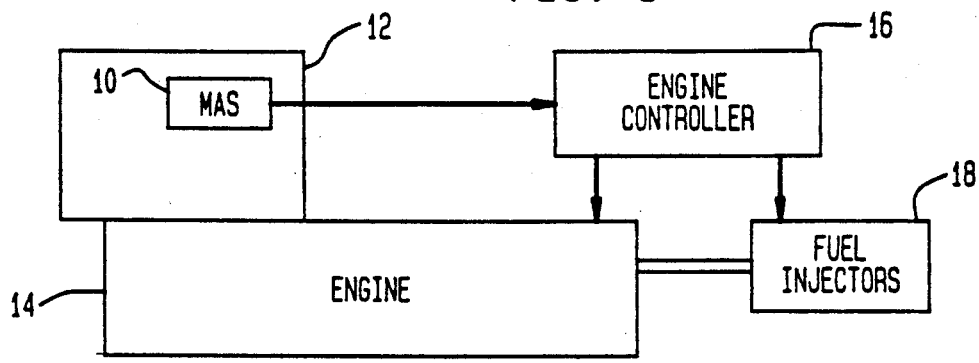
FIG. 1 is a schematic diagram of an engine having a mass airflow sensor and engine controller for implementing the method of the invention.

The method of the invention has been developed for implementation by existing automotive controls without hardware modification. It can be incorporated into a digital controller with a minimum of effort. A typical automotive control system is shown very generally in FIG. 1 wherein a mass airflow sensor (MAS) 10 in the induction passage 12 of an engine 14 supplies a signal to an engine controller 16. The controller 16, as is well known in the art, is a microprocessor based control which monitors the airflow signal as well as many engine parameters and calculates the fuel injection command along with other engine control signals and feeds the signals to the fuel injectors 18 and other engine operating elements. The controller 16 is adapted to use the filter process of this invention by programming a PROM in the controller to perform the method on the raw signal from the MAS 10.

Figure 2:
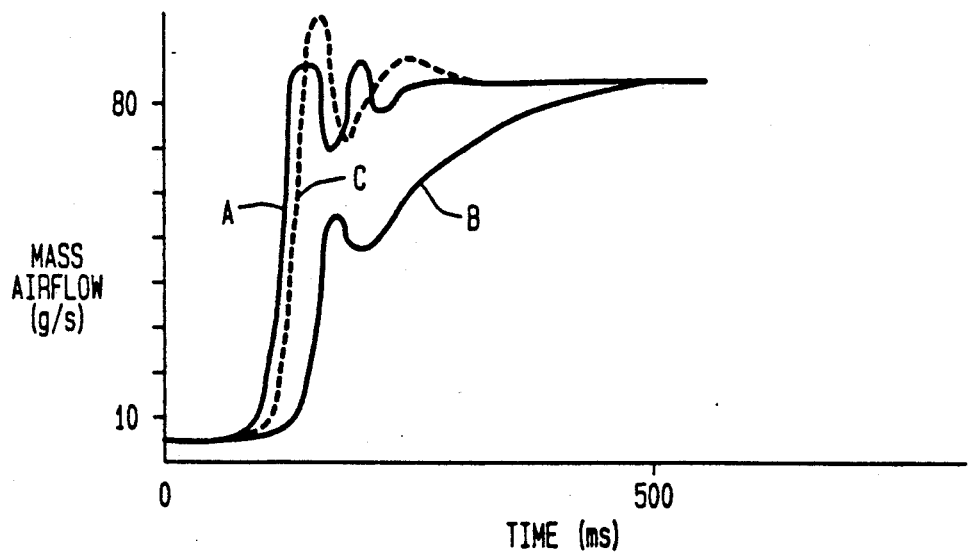
FIG. 2 is a graph of air meter output signal with and without enhancement compared to actual airflow.

The graph of FIG. 2 shows the actual airflow rate (curve A) for a step increase in throttle opening and the MAS response (curve B). The MAS response curve is developed by sampling the MAS output at a fixed rate, for example, every 6.25 microseconds. The MAS signal can be processed at the rate of sampling by adding leading terms to the signal such that the resulting combined output responds faster to the change in airflow. The leading term or differential error term is dependent on the change of the signal (delta input) from the previous sample (input[−1]) to the current sample (input[0]) and is also dependent on the meter time response at the current airflow rate. The error term is defined as error[0]=a*(delta input)+c*error[−1], where "error[−1]" is the error calculated for the previous sample and "delta input" is (input[0]−input[−1]). For the meter time constant w and a sampling period T, filter time constants a and c are determined such that for each value of w, $a=(2/T)/(w+b\ 2/T)$ and $c=(-w+2/T)/(w+2/T)$. For a given model of meter, the meter time constant w can be empirically determined as a function of airflow rate. To avoid calculation of the filter time constants a and c for each operation, they are calculated once for several values of the airflow rate and stored in a lookup table with input [0] as the index. The output of the filter is the input plus the error term times the gain, K.

In operation, each time a new sample (input[0]) is taken the following procedure or algorithm is executed:

Look up a and c in the table using input [0],
calculate error[0]=a*(input[0]−input[−1])+c*error[−1],
calculate output=input [0]+K*error[0],
set input[−1]=input [0], and
set error[−1]=error[0].

The procedure can be expanded for greater accuracy at the expense of calculation time and memory. Specifically, a second order error term, error[0]2 is calculated by providing a table for second order constants a2 and c2 which are a function of a second order time constant w2 and calculating the second order error in the same manner as the first order error. A second order gain, K2, is used to calculate the output which is output=input[0]+K*error[0]+K2*error[0]2.

This resulting set of points simulates the actual input but with a very small time lag as shown in Curve C of FIG. 2. Thus the algorithm requires the storage of old values for both raw input to and processed output from the algorithm.

Figure 3:
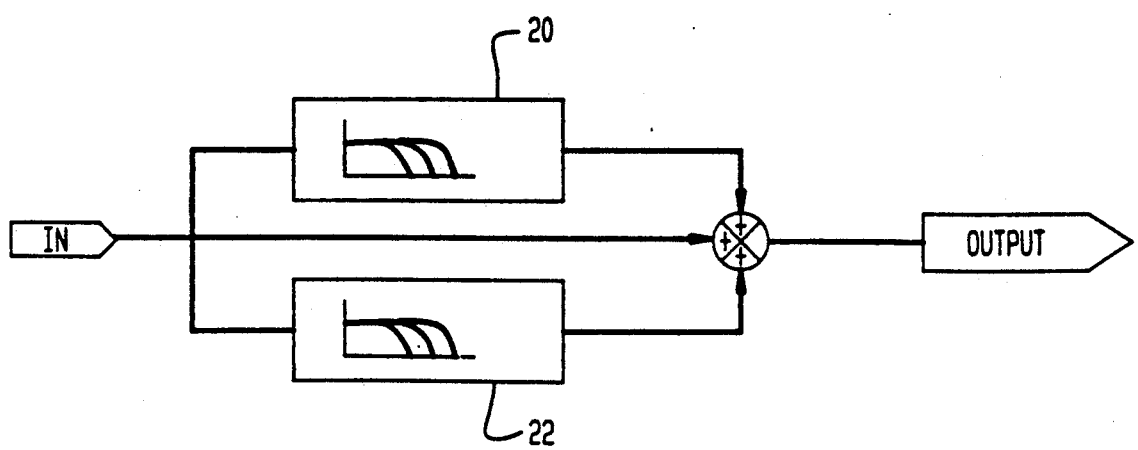
FIG. 3 is a symbolic illustration of the digital filter.

FIG. 3 symbolically illustrates the filter as a first order low pass filter 20 and a second order low pass filter 22 each having an output added to the input signal to comprise the output signal. Each filter has a variable time constant or bandwidth which depends on the input value. This is symbolized in the drawing by the family of curves in each of the boxes 20 and 22.

The algorithm can be added readily to a conventional engine controller with no hardware changes. Calibration can be roughed out using a microcomputer and fine tuned with emissions testing. The algorithm is compact and fast and is able to run at a limited digital sampling rate.

The embodiments of the invention in which an exclusive property or privilege is claimed are defined as follows:

1. In an automotive vehicle, the method of processing the signal from a mass air flow sensor comprising:
   establishing filter time constants as a function of the signal,
   periodically sampling the signal to obtain sampled flow values and using each sampled flow value as an input,
   determining the filter time constants for each input, and
   calculating an output for each input as a function of the input values and the filter time constants for each input, whereby the outputs more nearly represent the actual mass air flow rate than does the signal.

2. In an automotive vehicle, the method of processing the signal from a mass air flow sensor comprising:
   establishing filter time constants as a function of the signal,
   periodically sampling the signal at a sampling rate to obtain sampled flow values and using each sampled flow value as an input,
   determining the filter time constants for each input,
   calculating an error term as a function of the difference between successive inputs, the sampling rate, and the time constants, and
   calculating an output for each input as a function of the input and the error term, whereby the outputs more nearly represent the actual mass air flow rate than does the signal.

3. In an automotive vehicle, the method of digitally filtering the signal from a mass air flow sensor comprising:
   establishing filter time constants as a function of the signal and storing the constants in a table,
   periodically sampling the signal at a sampling rate to obtain sampled flow values and using each sampled flow value as an input,
   for each input, looking up the time constants in the table and calculating an error term as a function of the difference between successive inputs, the sampling rate, and the time constants, and
   calculating an output for each input as a function of the input and the error term, whereby the outputs more nearly represent the actual mass air flow rate than does the signal.

4. The invention as defined in claim 3 wherein the time constants are $a=(2/T)/(w+b\ 2/T)$ and $c=(-w+2/T)/(w+2/T)$ where $w$ is a meter time constant for a given signal value and $T$ is the sampling period, and the error term is $a*(\text{delta input})+c*\text{error}$ where "delta input" is the current input less the previously sampled input and "error" is the calculated error term for the previous sample.

5. The invention as defined in claim 4 wherein the output is calculated as the input plus the product of a gain constant and the error term.

6. In an automotive vehicle, the method of digitally filtering the signal from a mass air flow sensor comprising:
   establishing first order and second order time constants as a function of the signal and storing the constants in a table,
   periodically sampling the signal and using each sampled value as an input,
   looking up the time constants for each input in the table,
   calculating a first order error term as a function of the difference between successive inputs, the sampling rate, and the first order time constants,
   calculating a second order error term as a function of the difference between successive inputs, the sampling rate, and the second order time constants,
   establishing a gain for each error term, and
   calculating an output for each input as the input plus each error term times its respective gain, whereby the outputs more nearly represent the actual mass air flow rate than does the signal.

* * * * *